United States Patent [19]

Mochizuki et al.

[11] Patent Number: 4,841,137
[45] Date of Patent: Jun. 20, 1989

[54] BEAM POSITION CONTROL DEVICE

[75] Inventors: Takeshi Mochizuki, Ibaragi; Akira Arimoto; Susumu Saito, both of Tokyo, all of Japan

[73] Assignees: Hitachi Koki Company, Limited; Hitachi, Ltd., both of Japan

[21] Appl. No.: 69,122

[22] Filed: Jul. 2, 1987

[30] Foreign Application Priority Data

Jul. 4, 1986 [JP] Japan ................. 61-156079

[51] Int. Cl.⁴ .................... H01J 3/14; H04N 1/10
[52] U.S. Cl. ..................... 250/236; 346/108; 358/293
[58] Field of Search ............. 358/292, 293, 294, 296; 250/226, 225, 234, 235, 236; 350/6.5, 6.6, 6.7, 6.8; 346/108

[56] References Cited

U.S. PATENT DOCUMENTS

| | | | |
|---|---|---|---|
| 4,180,822 | 12/1979 | Hudson et al. | 358/293 |
| 4,209,793 | 6/1980 | Ueno | 346/108 |
| 4,516,023 | 5/1985 | Morrill et al. | 250/235 |
| 4,523,093 | 6/1985 | Neumann | 358/293 |
| 4,600,837 | 7/1986 | Di Stefano et al. | 358/293 |
| 4,644,160 | 2/1987 | Arimoto et al. | 250/578 |
| 4,661,699 | 4/1987 | Welmers et al. | 358/293 |
| 4,667,099 | 5/1987 | Arai et al. | 358/293 |
| 4,691,241 | 9/1987 | Tomohisa et al. | 358/293 |
| 4,700,236 | 10/1987 | Abe | 358/293 |
| 4,725,855 | 2/1988 | Arimoto et al. | 346/108 |
| 4,760,407 | 7/1988 | Arimoto et al. | 346/108 |

Primary Examiner—David C. Nelms
Assistant Examiner—Michael Messinger
Attorney, Agent, or Firm—Sughrue, Mion, Zinn, Macpeak & Seas

[57] ABSTRACT

A beam deflector device in which two light beams from two light sources are simultaneously applied through movable reflectors to a beam deflector scanning a drum. The beams are also applied, through a beam splitter to two photodetectors used to control the position of the respective reflector. The two beams are separated before they are applied to the photodetectors by means of polarization plates, color filters, diffraction gratings or prisms.

12 Claims, 3 Drawing Sheets

BEAM POSITION CONTROL DEVICE

BACKGROUND OF THE INVENTION

1. Field of the Invention

This invention relates to a light beam position control device for a beam deflector.

2. Background of the Invention

An example of a conventional light beam position control device for a beam deflector will be described with reference to FIG. 1, As shown in FIG. 1, light beams 1 and 2 emitted from light sources 11 and 12 are collimated by condenser lenses 13 and 14, and respectively reflected by movable reflectors 5 and 6. The light beams 1 and 2 thus collimated are applied to a beam splitter 15 so as to be split into beams advancing towards a beam deflector 16 and beams advancing towards photo detectors 3 and 4. The beam deflector 16 is a rotating polygonal mirror. The beams advancing towards the beam deflector 16, after being reflected, are focused on a drum 18 by an f-θ lens 17 or the like, thus defining two scanning lines as the beam deflector 16 rotates. On the other hand, the beams advancing towards the photo detectors 3 and 4 are focused on the photo detectors 3 and 4 by a focusing lens 19. The photo detectors 3 and 4 form a position detecting sensor for maintaining the relative position of the two light sources 11 and 12 constant. The surface of the drum 18 and the photo detectors 3 and 4 are in the focusing planes of the lens systems 17 and 19, respectively. The beam diameters and the beam distance on the drum 18 are equal to those on the photo detectors 3 and 4, respectively. In order to position the beams 1 and 2 adjacent to each other on the drum 18, the beams are positioned adjacent to each other on the photo detectors 3 and 4.

When the beams 1 and are displaced on the photo detectors 3 and 4, the differential output of each of the photo detectors 3 and 4 is applied to a servo circuit 23, which outputs a corresponding servo signal. The servo signal operates actuators 7 and 8 moving the movable reflectors 5 and 6 so that the position of the beams 1 and 2 on the photo detectors 3 and 4 are corrected.

A conventional method of positioning the beams on the photo detectors is as shown in FIG. 2. When the power switch has been turned off, the positions of the beams 1 and 2 are not constant. When the power switch is turned on, the servo circuit 23 operates to suspend the application of the output signals of the photo detectors 3 and 4 to the movable reflectors 5 and 6, and to move the movable reflectors 5 and 6 so that the first beam 1 is applied to the first photo detector 3 which should receive the beam 1 and the second beam 2 is applied to the second photo detector 4 which should receive the second beam 2. Upon detection of the beams by the photo detectors 3 and 4, the servo circuit 23 is so operated that the movable reflectors 5 and 6 are moved according to the output signals of the photo detectors 3 and 4. This operation is, however, effected even when the first beam 1 is applied to the second photo detector 4 while the second beam 2 is applied to the first photo detector 3. This erroneous operation may be eliminated by a method in which, before the beams 1 and 2 are positioned on the photo detectors 3 and 4, the beam 1 is placed above the first photo detector 3 while the second beam 2 is placed below the second photo detector 4. However, the method makes the beams positioning operation correspondingly intricate.

SUMMARY OF THE INVENTION

Accordingly, an object of this invention is to eliminate the above-described difficulty accompanying a conventional beam position control device.

More specifically, an object of the inention is to provide a beam position control device which can readily position beams and which is low in manufacturing cost and high in reliability.

The foregoing object and other objects of the invention have been achieved by the provision of a beam position control device for a beam deflecting device in which a plurality of light beams from a plurality of light sources are simultaneously applied through movable reflectors to a beam deflector so as to be deflected. The light beams thus deflected are focused to scan a photosensitive drum. A beam splitter disposed between the light sources and the beam deflector splits the light beams, and the light beams thus split are applied to respective photo detectors to thereby position the light beams. The control device, according to the invention, comprises a filter member provided on the beam incidence side of the photo detectors, for selectively applying the light beams to the photo detectors.

The nature, principle and utility of the invention will become more apparent from the following detailed description when read in conjunction with the accompanying drawings.

DETAILED DESCRIPTION OF THE INVENTION

Figure 1:
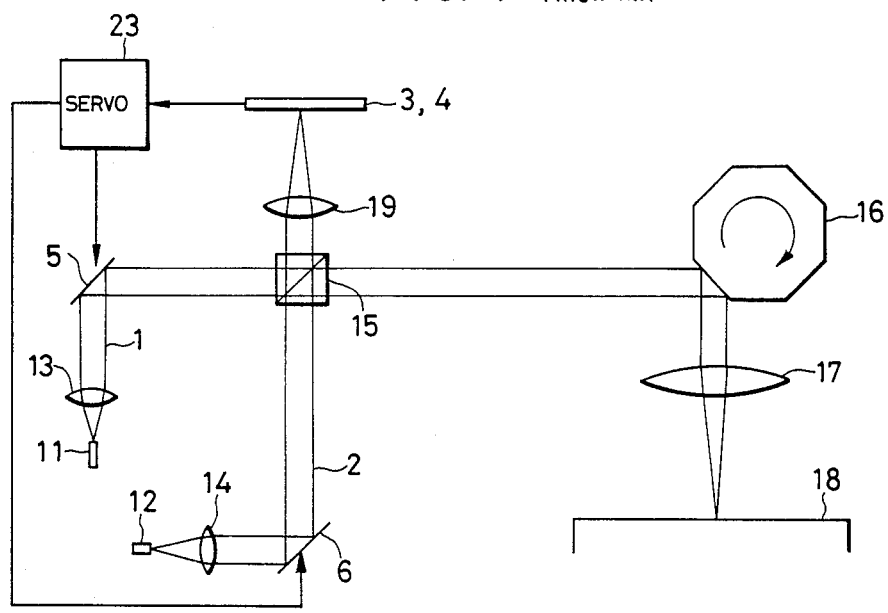
FIG. 1 is an explanatory diagram showing the arrangement of an example of a conventional beam positon control device.
Figure 2:
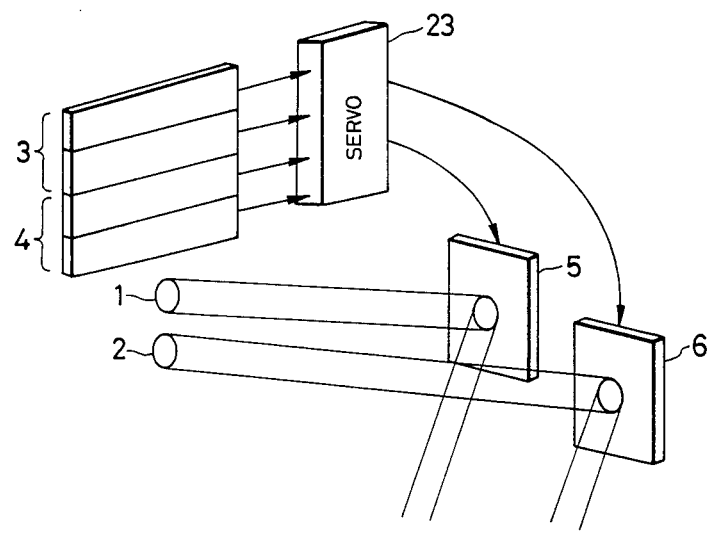
FIG. 2 is a perspective view showing essential components in the conventional device of FIG. 2.
Figure 3:
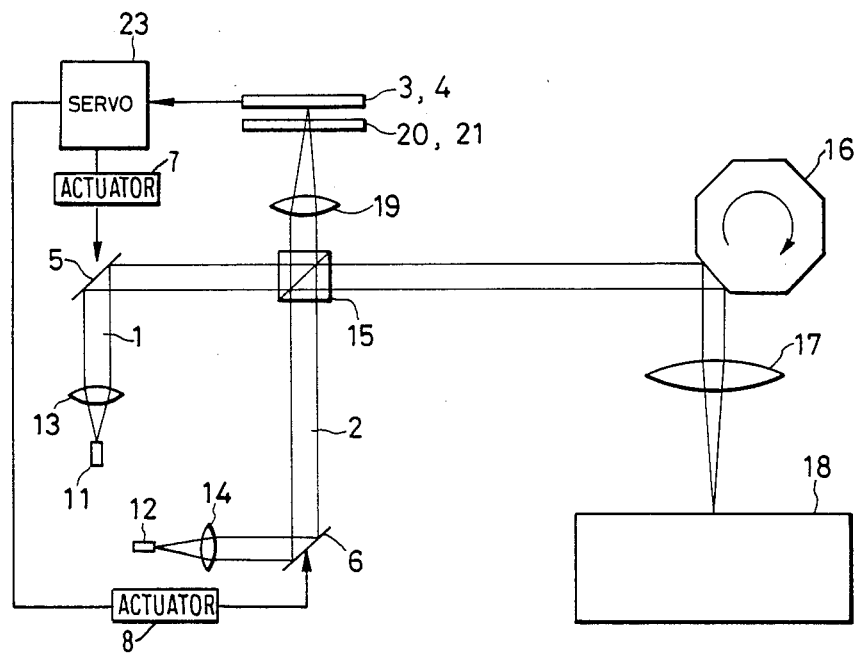
FIG. 3 is an explanatory diagram showing the arrangement of an example of a beam position control device according to this invention.
Figure 4:
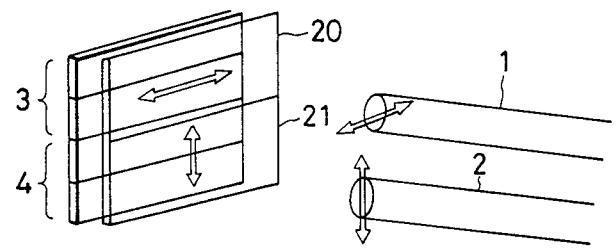
FIG. 4 is a perspective view showing photo detectors in the beam position control device of the invention.

One example of a beam position control device according to this invention will be described with reference to FIGS. 3 and 4, in which those components which have been already described with reference to FIG. 1 are therefore designated by the same reference numerals.

In the beam position control device of the invention, two light sources 11 and 12 are positioned in such a manner that the directions of polarization thereof are perpendicular to each other. The selective polarization can be achieved using polarization plates between the light sources 11 and 12 and the beam splitter 15. Polarization plates 20 and 21 are placed in front of the photo detectors 3 and 4, respectively, in such a manner that the plates are coincident in the direction of polarization with the respective beams. When the power switch is turned on, the beams are applied to the photo detectors 3 and 4 as follows. First, the application of the output signals of the photo detectors 3 and 4 through the servo circuit 23 to the movable reflectors 5 and 6 is suspended and the movable reflectors 5 and 6 are moved in a predetermined way so that the beams 1 and 2 cross both the detectors 3 and 4. Upon detection of the beams 1 and 2 by the photo detectors 3 and 4, the movable reflectors 5 and 6 are moved by servo signals.

Each of the detectors 3 and 4 is a split detector having two parallel detector sections. The outputs of the two detector sections are separately applied to separate sections of the servo control circuit 23. The servo control circuit 23 takes the difference of the two input signals and outputs an error signal to a motor 7 or 8 rotating the reflector 5 or 6. The error signal rotates the reflector 5 or 6 so as to reduce the error signal. That is, the servo control circuit 23 rotates the reflector 5 or 6 so as to place the beam 1 or 2 in the middle of the detector 3 or 4.

The polarization plates 20 and 21 are arranged in front of the photo detectors 3 and 4 so as to selectively transmit the two beams 1 and 2 to the photo detectors. Therefore, the two beams 1 and 2 are not affected by each other, as a result of which the beam positioning operation can be readily achieved.

The degree of coincidence in the direction of polarization between the polarization plates 20 and 21 and the beams should be such that the beam not selected is not detected by the photo detector for which it is intended.

Figure 5:
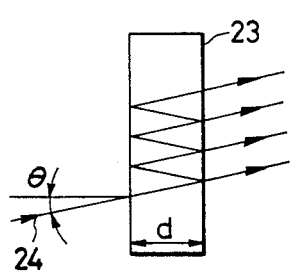
FIG. 5 is an explanatory diagram for a description of a first modification of the beam position control device according to the invention.

In the above-described embodiment, one of the beams is selected by utilizing the difference in the direction of polarization between the beams. However, if beams different in wavelength are used, then one of the beams can be selected with an interference filter. The beam wavelength can be determined by using color filters at the light sources 11 and 12 or by using light emitting diodes of different emission wavelength for the light sources 11 and 12. In the case where, as shown in FIG. 5, a light beam 24 is applied to an interference filter 23 having a thickness of d and a refractive index of n at an incident angle of $\theta$, a wavelength $\lambda$ providing a maximum transmittance is:

$$\lambda = (2 \cdot n \cdot d \cdot \cos \theta)/m$$

where m is an integer.

Figure 6:
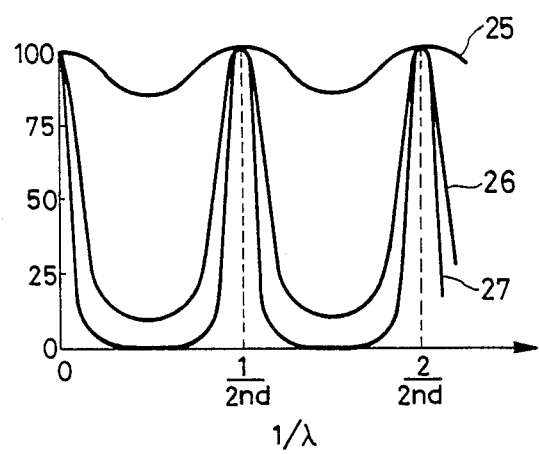
FIG. 6 is a graphical representation for a description the operating principle of the first modification shown in FIG. 5.

As shown in FIG. 6, the range of wavelengths transmitted changes with the reflection factor r of the inner surface of the film. This means that the difference in transmittance between a waveform to be selected and that not to be selected can be made large. In FIG. 6, the curve 25 is plotted for r=0.2, the curve 26 for r=0.7, and the curve 27 for r=0.9.

Figure 7:
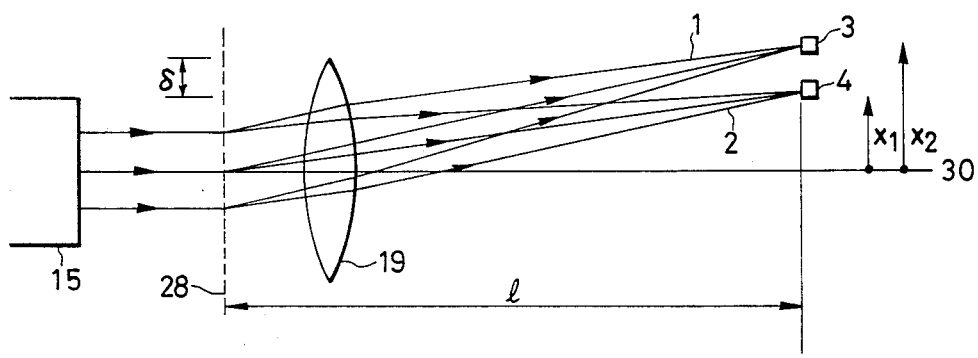
FIGS. 7 and 8 are explanatory diagrams for a description of second and third modifications of the beam position control device according to the invention.

Instead of the above-described interference filter, a diffraction grating may be employed. In this method, as shown in FIG. 7, a diffraction grating 28 having a grating period of $\delta$ is disposed between the beam splitter 15 and the focusing lens in front of the photo detectors 3 and 4. If the beams 1 and 2 are different in wavelength, the distance between the image points changes because of the different angles of diffraction. Therefore, positioning the photo detectors 3 and 4 at the image points of refracted beams suitable in the order of diffraction can eliminate the mutual interference of the beams 1 and 2. In this modification, the necessary conditions are as follows:

$$|x_1 - x_2| \geq D$$

$$\frac{x_1 - x_2}{|x_1 - x_2|} \cdot \Delta\theta_1 \geq \frac{D - |x_1 - x_2|}{l}$$

$$\frac{x_2 - x_1}{|x_1 - x_2|} \cdot \Delta\theta_2 \geq \frac{D - |x_1 - x_2|}{l}$$

where $x_1$ and $x_2$ are the displacements of the image points of the beams 1 and 2 where the photo detectors 3 and 4 are disposed from the optical axis 30, D is the beam diameter, l is the distance between the diffraction grating 28 and the photo detectors 3 and 4, and $\Delta\theta_1$ and $\Delta\theta_2$ are the variations of the incident angles of the beams 1 and 2 to the diffraction grating 28 with respect to the optical axis 30 ($\Delta\theta_1 \simeq 0$ and $\Delta\theta_2 \simeq 0$).

Figure 8:
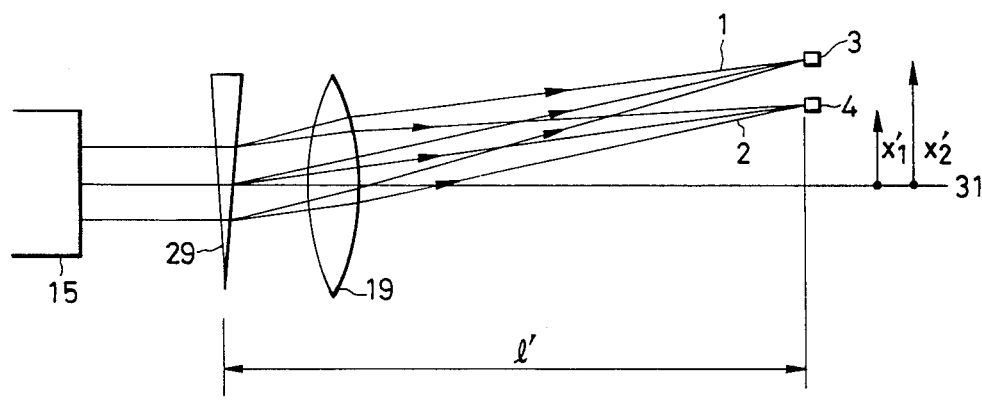

Furthermore, instead of the diffraction grating, a prism may be employed according to the invention. In this modification, a prism 29 is arranged between the beam splitter 15 and the focusing lens 19 in front of the photo detectors 3 and 4 as shown in FIG. 8. If the beams 1 and 2 are different in wavelength, then the are subject to a different refractive index when passing through the prism 29. Therefore the distance between the image points of the beams changes. The photo detectors 3 and 4 are positioned on the image points. In the modification, the conditions for eliminating the mutual interference of the beams 1 and 2 are as follows:

$$\frac{x_1' - x_2'}{|x_1' - x_2'|} \cdot \Delta\Psi_1 \geq \frac{D - |x_1' - x_2'|}{l'}$$

$$\frac{x_2' - x_1'}{|x_1' - x_2'|} \cdot \Delta\Psi_2 \geq \frac{D - |x_1' - x_2'|}{l'}$$

where $x_1'$ and $x_2'$ are the distances of the image points of the beams 1 and 2 from the optical axis 31, D is the beam diameter, l' is the distance between the prism 29 and the photo detectors 3 and 4, and $\Delta\Psi_1$ and $\Delta\Psi_2$ are the variations of the incident angles of the beams 1 and 2 to the prism with respect to the optical axis ($\Delta\Psi_1 \simeq 0$, and $\Delta\Psi_2 \simeq 0$).

As is apparent from the above description, in the beam position control device of the invention, a plurality of light beams are not affected by one another. Therefore, in the device of the invention, the beams can be readily applied to the photo detectors when the power switch is turned on. In addition, the device of the invention is low in manufacturing cost and high in reliability.

What is claimed is:

1. A beam deflecting device, comprising:
two light sources for providing first and a second light beam;
a deflector;
a recording medium;
a beam splitter for splitting said first and second light beams into a first and a second scanning light beam respectively incident upon said deflector for scanning said recording medium, and a first and a second reference light beam respectively;
a light detector having a first and a second beam position detector which are contained in the same plane; and separating means positioned between said beam splitter and said first and second beam position detectors for separating said first and second reference light beams to fall respectively upon said first and second beam position detectors.

2. A beam deflecting device as recited in claim 1, further comprising two beam position control devices for respectively controlling positions of said first and second light beams responsive to respective outputs of said first and second beam position detectors.

3. A beam deflecting device as recited in claim 2, wherein said beam position control devices comprise two movable reflectors reflecting respective outputs of said two light sources.

4. A beam deflecting device as recited in claim 2, wherein said first and second beams have differing polarization characteristics and wherein said separating means comprises polarization plates of differing polarization characteristics positioned in front of said first and second light beam position detectors respectively.

5. A beam deflecting device as recited in claim 2, wherein said first and second beams have differing spectral characteristics and wherein said separating means separates said first and second reference light beams according to said spectral characteristics.

6. A beam deflecting device as recited in claim 5, wherein said separating means comprises color filters disposed in front of said first and second beam position detectors respectively.

7. A beam deflecting device as recited in claim 6, wherein said color filters are interference filters.

8. A beam deflecting device as recited in claim 5, wherein said separating means comprises a diffraction grating.

9. A beam deflecting device as recited in claim 5, wherein said separating means comprises a prism.

10. A beam deflecting device as recited in claim 1, wherein said deflector is a rotating polygonal mirror having a plurality of movable reflectors.

11. A beam deflecting device as recited in claim 1, wherein said first and second beam position detectors are adjacent to each other in said plane.

12. A beam detecting device, comprising:
 a plurality of light sources for providing a plurality of light beams;
 a plurality of movable reflectors for reflecting said plurality of light beams;
 a beam deflector for deflecting said light beams;
 a recording medium upon which said deflected light beams are focused so that the recording medium may be scanned;
 a beam splitter disposed between said light sources and said beam deflector for splitting said light beams;
 a plurality of photo detectors upon which said split light beams respectively fall for detection and correction of aberrations of the position of said light sources to fixedly keep a relative position of said light beams on said recording medium; and
 a beam position control device comprising a filter member provided on the beam incidence side of said photo detectors for selectively applying said light beams to said photo detectors in such a manner that directions of light paths thereof are not substantially changed.

* * * * *